US009777565B2

(12) United States Patent
Maguire-Boyle et al.

(10) Patent No.: US 9,777,565 B2
(45) Date of Patent: Oct. 3, 2017

(54) COMPOSITION INCLUDING FUNCTIONALIZED POLYSACCHARIDE FOR TREATMENT OF SUBTERRANEAN FORMATIONS

(71) Applicant: Halliburton Energy Services, Inc., Houston, TX (US)

(72) Inventors: Samuel James Maguire-Boyle, Houston, TX (US); Ali Alwattari, The Woodlands, TX (US); Lucas Kurtis Fontenelle, Porter, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 12 days.

(21) Appl. No.: 14/587,998

(22) Filed: Dec. 31, 2014

(65) Prior Publication Data
US 2016/0186045 A1 Jun. 30, 2016

(51) Int. Cl.
E21B 43/26 (2006.01)
C09K 8/03 (2006.01)
C09K 8/64 (2006.01)
C09K 8/035 (2006.01)
C09K 8/68 (2006.01)
C09K 8/82 (2006.01)
C09K 8/90 (2006.01)

(52) U.S. Cl.
CPC ............ *E21B 43/26* (2013.01); *C09K 8/035* (2013.01); *C09K 8/64* (2013.01); *C09K 8/68* (2013.01); *C09K 8/82* (2013.01); *C09K 8/90* (2013.01); *C09K 2208/28* (2013.01)

(58) Field of Classification Search
CPC .......... E21B 43/26; C09K 8/035; C09K 8/64; C09K 8/68; C09K 8/82; C09K 8/90; C09K 2208/28
See application file for complete search history.

(56) References Cited

U.S. PATENT DOCUMENTS

| 4,553,601 A | 11/1985 | Almond et al. |
| 5,539,044 A | 7/1996 | Dindi et al. |
| 7,530,393 B2 | 5/2009 | Wood et al. |
| 7,806,182 B2 | 10/2010 | Waters et al. |
| 8,043,999 B2 | 10/2011 | Sullivan et al. |
| 8,211,835 B2 | 7/2012 | Howard et al. |
| 8,517,095 B2 | 8/2013 | Armstrong et al. |
| 2016/0053165 A1* | 2/2016 | Weaver ................. C09K 8/035 507/201 |

(Continued)

FOREIGN PATENT DOCUMENTS

WO    WO 2013068771 A1 *  5/2013  ............... C09K 8/03

*Primary Examiner* — Zakiya W Bates
*Assistant Examiner* — Crystal J Miller
(74) *Attorney, Agent, or Firm* — Chamberlain Hrdlicka

(57) ABSTRACT

Various embodiments disclosed relate to compositions including functionalized polysaccharide for treatment of subterranean formations and methods and systems including the same. In various embodiments, the present invention provides a method of treating a subterranean formation. The method includes placing in a subterranean formation a composition including a functionalized polysaccharide that includes a hydroxy($C_1$-$C_5$)alkyl functionalization and a polyhydroxy($C_2$-$C_5$)alkyl functionalization.

20 Claims, 3 Drawing Sheets

(56) References Cited

U.S. PATENT DOCUMENTS

| | | | |
|---|---|---|---|
| 2016/0083860 A1* | 3/2016 | Monteiro | C23C 18/1646 427/122 |
| 2016/0102236 A1* | 4/2016 | Alwattari | C09K 8/685 166/278 |
| 2016/0152888 A1* | 6/2016 | Alwattari | C09K 8/68 166/308.3 |
| 2016/0289526 A1* | 10/2016 | Alwattari | C09K 8/035 |

* cited by examiner

COMPOSITION INCLUDING FUNCTIONALIZED POLYSACCHARIDE FOR TREATMENT OF SUBTERRANEAN FORMATIONS

BACKGROUND

During the hydraulic fracturing, fracturing fluids are pumped through wellbores and tubular structures (e.g., pipes, coiled tubing, etc.). A considerable amount of energy may be lost due to turbulence in the treatment fluid during pumping. As a result of these energy losses, additional horsepower may be needed to achieve the desired treatment. Excessive turbulence can damage wellbores and subterranean formations. To reduce damage and energy losses, fluid friction-reducers can be included in these treatment fluids. Fluid friction-reducers are chemical additives that alter fluid rheological properties to reduce friction created within a fluid as it flows through tubulars or other flowpaths. Most ionic friction-reducer polymers are salt intolerant, and lose effectiveness in salt water (e.g., NaCl or KCl).

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
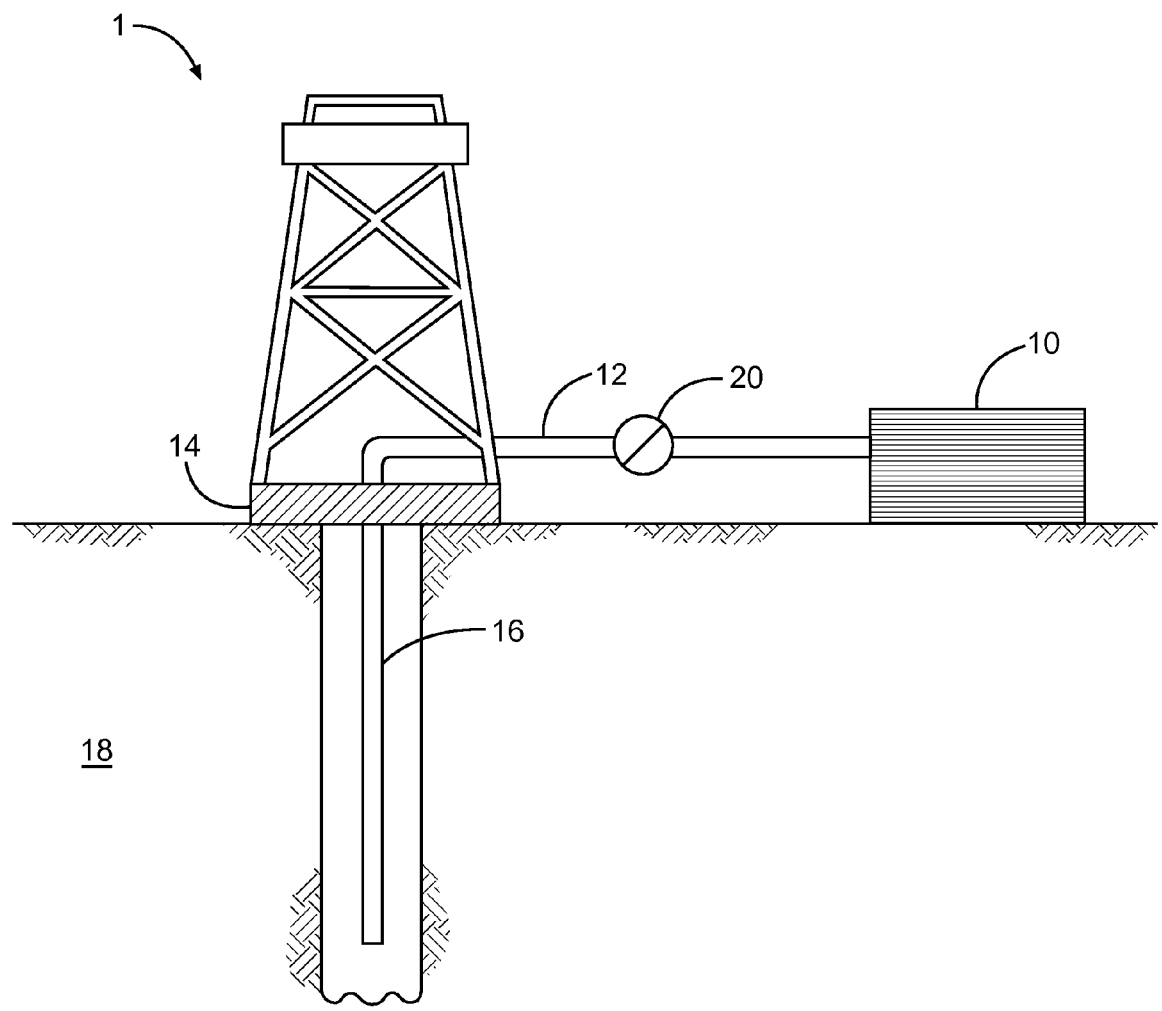
FIG. 1 illustrates a system or apparatus for delivering a composition to a subterranean formation, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000.1" is equivalent to "0.0001."

In the methods of manufacturing described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, within 1%, or within 0% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can itself be substituted or unsubstituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Non-limiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "fracturing fluid" refers to fluids or slurries used downhole during fracturing operations.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean hydrocarbon- or water-producing formation or region in contact (e.g., fluid contact) with the wellbore. Placing a material in a subterranean formation can include contacting the material with any section of a wellbore or with any subterranean region in contact (e.g., fluid contact) therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous hydrocarbon materials, water, or any section below-ground in contact (e.g., fluid contact) therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean hydrocarbon- or water-producing region, directly or through one or more fractures or flow pathways.

As used herein, a "flow pathway" downhole can include any suitable subterranean flow pathway through which two subterranean locations are in fluid connection. The flow pathway can be sufficient for hydrocarbon or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a hydrocarbon source and can include hydrocarbon. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product or fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), a gas (e.g., a material that is a gas at standard temperature and pressure, such as $CO_2$, $NH_3$, $CH_4$, $N_2$, in any suitable flowable or conveyable form, such a gaseous, liquid, or supercritical state), surfactants, an acid (e.g., HCl, HF, $H_2SO_4$), foams, water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In various embodiments, the present invention provides a method of treating a subterranean formation. The method includes placing in a subterranean formation a composition including a functionalized polysaccharide. The functionalized polysaccharide includes a hydroxy($C_1$-$C_5$)alkyl functionalization. The functionalized polysaccharide also includes a polyhydroxy($C_2$-$C_5$)alkyl functionalization.

In various embodiments, the present invention provides a method of treating a subterranean formation. The method includes placing in a subterranean formation a composition including a functionalized linear cellulose. The functionalized linear cellulose includes a hydroxyethyl functionalization. The functionalized linear cellulose also includes a dihydroxypropyl functionalization. An average number of the hydroxyethyl functionalizations per saccharide monomer of the cellulose is about 0.01 to about 10. An average number of the dihydroxypropyl functionalizations per saccharide monomer of the cellulose is about 0.01 to about 10.

In various embodiments, the present invention provides a method of treating a subterranean formation. The method includes placing in a subterranean formation a composition including a functionalized linear cellulose. The functionalized linear cellulose includes an HE (e.g., hydroxyethyl, or a functionalized derivative thereof) functionalization having the structure $R^1$—O—$CH_2$—$CH_2$—. The functionalized linear cellulose also includes a DHP (e.g., dihydroxypropyl, or a functionalized derivative thereof) functionalization having the structure $R^2$—O—$CH_2$—$CH(OR^3)$—$CH_2$—. At each occurrence, $R^1$, $R^2$, and $R^3$ are each independently chosen from —H, HE, and DHP. An average number of the HE functionalizations per saccharide monomer of the functionalized linear cellulose is about 0.01 to about 10. An average number of the DHP functionalizations per saccharide monomer of the functionalized linear cellulose is about 0.01 to about 10.

In various embodiments, the present invention provides a system including a tubular disposed in a subterranean formation. The system also includes a pump configured to pump a composition including a functionalized polysaccharide in the subterranean formation through the tubular. The composition including the functionalized polysaccharide includes a hydroxy($C_1$-$C_5$)alkyl functionalization and a polyhydroxy($C_2$-$C_5$)alkyl functionalization.

In various embodiments, the present invention provides a composition for treatment of a subterranean formation. The composition includes a functionalized polysaccharide that includes a hydroxy($C_1$-$C_5$)alkyl functionalization and a polyhydroxy($C_2$-$C_5$)alkyl functionalization.

In various embodiments, the present invention provides a composition for treatment of a subterranean formation. The composition includes a functionalized linear cellulose that includes a hydroxyethyl functionalization and a dihydroxypropyl functionalization. An average number of the hydroxyethyl functionalizations per saccharide monomer of the cellulose is about 0.01 to about 10. An average number of the dihydroxypropyl functionalizations per saccharide monomer of the cellulose is about 0.01 to about 10.

In various embodiments, the present invention provides a composition for treatment of a subterranean formation. The composition includes a functionalized linear cellulose including an HE functionalization having the structure $R^1$—O—$CH_2$—$CH_2$— and a DHP functionalization having the structure $R^2$—O—$CH_2$—$CH(OR^3)$—$CH_2$—. At each occurrence, $R^1$, $R^2$, and $R^3$ are each independently chosen from —H, HE, and DHP. An average number of the HE functionalizations per saccharide monomer of the functionalized linear cellulose is about 0.01 to about 10. An average number of the DHP functionalizations per saccharide monomer of the functionalized linear cellulose is about 0.01 to about 10.

In various embodiments, the present invention provides a method of preparing a composition for treatment of a subterranean formation. The method includes forming a composition including a functionalized polysaccharide that includes a hydroxy($C_1$-$C_5$)alkyl functionalization and a polyhydroxy($C_2$-$C_5$)alkyl functionalization.

In various embodiments, the functionalized polysaccharide can provide higher friction reduction activity than other polysaccharide polymers, such as compared to cellulosic materials. In some embodiments, the functionalized polysaccharide can provide viscosification in addition to friction reduction, such as in a crosslinked form. In various embodiments, a lower loading of the functionalized polysaccharide can be used to provide similar friction reduction, as compared to other friction reducers such as guar-based (e.g., guar or guar derivatives) or cellulosic materials (e.g. cellulose or cellulose derivatives). In various embodiments, the functionalized polysaccharide can be more environmentally friendly than other friction reducers. In various embodiments, the low toxicity of the functionalized polysaccharide can allow it to be used in various regions, such as areas with strict environmental policies such as the North Sea, Australia, Europe and California. In various embodiments, the functionalized polysaccharide can be at least one of less expensive to produce and less expensive to use than other friction reducers, such as compared to other friction reducers such as guar-based or cellulosic materials.

In various embodiments, the functionalized polysaccharide can be easier to clean up than other friction reducers, with cleaner breaking behavior, low residue filter cake, and with less or no coagulation or flocculation under various conditions. In various embodiments, the functionalized polysaccharide can be a low residue polymer which can be beneficial for stimulating low porosity formations, because of producing low quantities of residue upon hydrolysis as compared to galactomanose-based gelling agents such as guar and its derivatives. In various embodiments, the functionalized polysaccharide can be an advantageous polymer over other friction reducing materials because of its ability to break cleanly using traditional oxidizing breakers, and can reduce the possible formation of coagulated ions such as iron, calcium and other divalent ions which tend to affect production after treatment with other friction reducers such as polyacrylamide-based friction reducers, especially when little knowledge of the lithology of the formation is known.

In various embodiments, the functionalized polysaccharide can be a non-ionic polymer, which can be more compatible with water having high total dissolved solids (TDS) levels than ionic polymers. In various embodiments, the high TDS tolerance of the functionalized polysaccharide can provide quick hydration times (e.g., beneficial for field operations that are under time constraints). In various embodiments, the high TDS tolerance of the functionalized polysaccharide can allow for use in off-shore operations as well as use in other regions such as arid regions. In various embodiments, the functionalized polysaccharide in high TDS water can flocculate and coagulate less than ionic polymers, for example, with less formation of "gummy bears." In various embodiments, the use of the functionalized polysaccharide as a non-ionic friction reducer can be highly beneficial to an operator when a slickwater frac is required but the local area has a scarcity of fresh water and where the only cost-effective source of water is brackish or contains high quantities of TDS.

Method of Treating a Subterranean Formation.

In some embodiments, the present invention provides a method of treating a subterranean formation. The method includes placing a composition including a functionalized polysaccharide in a subterranean formation. The placing of the composition in the subterranean formation can include contacting the composition and any suitable part of the subterranean formation, or contacting the composition and a subterranean material, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing and can include any suitable contacting between the subterranean formation and the composition. The placing of the composition in the subterranean formation can include at least partially depositing the composition in a fracture, flow pathway, or area surrounding the same.

In some embodiments, the method includes obtaining or providing the composition including functionalized polysaccharide. The obtaining or providing of the composition can occur at any suitable time and at any suitable location. The obtaining or providing of the composition can occur above the surface (e.g., the components that form the composition can be mixed above-surface). The obtaining or providing of the composition can occur in the subterranean formation (e.g., the components that form the composition can be mixed downhole).

The method can include hydraulic fracturing, such as a method of hydraulic fracturing to generate a fracture or flow pathway. In various embodiments, the composition that includes the functionalized polysaccharide can be a fracturing fluid. The method of treating the subterranean formation can include fracturing the subterranean formation with the composition including the functionalized polysaccharide. The placing of the composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the composition is placed in or contacted to, or the composition is placed in or contacted to an area surrounding the generated fracture or flow pathway.

In some embodiments, in addition to the functionalized polysaccharide, the composition can include at least one of an aqueous liquid and a water-miscible liquid. The method can further include mixing the aqueous liquid or water-miscible liquid with the functionalized polysaccharide. The mixing can occur at any suitable time and at any suitable location, such as above surface or in the subterranean formation. The aqueous liquid can be any suitable aqueous liquid, such as at least one of water, brine, produced water, flowback water, brackish water, and sea water. In some embodiments, the aqueous liquid can include at least one of a drilling fluid, a hydraulic fracturing fluid, a diverting fluid, and a lost circulation treatment fluid. The water-miscible liquid can be any suitable water-miscible liquid, such as methanol, ethanol, ethylene glycol, propylene glycol, glycerol, and the like.

The composition including the functionalized polysaccharide can include any suitable proportion of the aqueous liquid or the water-miscible liquid, such that the composition can be used as described herein. For example, about 0.000.1 wt % to 99.999.9 wt % of the composition can be the aqueous liquid, water-miscible liquid, or combination thereof, or about 0.01 wt % to about 99.99 wt %, about 0.1 wt % to about 99.9 wt %, or about 20 wt % to about 90 wt %, or about 0.000.1 wt % or less, or about 0.000.001 wt %, 0.000.1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999 wt %, or about 99.999.9 wt % or more of the composition can be the aqueous liquid, water-miscible liquid, or combination thereof.

The aqueous liquid can be a salt water. The salt can be any suitable salt, such as at least one of NaBr, $CaCl_2$, $CaBr_2$, $ZnBr_2$, KCl, NaCl, a carbonate salt, a sulfonate salt, sulfite salts, sulfide salts, a phosphate salt, a phosphonate salt, a magnesium salt, a bromide salt, a formate salt, an acetate salt, and a nitrate salt. The aqueous liquid can have any suitable total dissolved solids level, such as about 1,000 mg/L to about 250,000 mg/L, or about 1,000 mg/L or less, or about 5,000 mg/L, 10,000, 15,000, 20,000, 25,000, 30,000, 40,000, 50,000, 75,000, 100,000, 125,000, 150,000, 175,000, 200,000, 225,000, or about 250,000 mg/L or more. The aqueous liquid can have any suitable salt concentration, such as about 1,000 ppm to about 300,000 ppm, or about 1,000 ppm to about 150,000 ppm, or about 1,000 ppm or less, or about 5,000 ppm, 10,000, 15,000, 20,000, 25,000, 30,000, 40,000, 50,000, 75,000, 100,000, 125,000, 150,000, 175,000, 200,000, 225,000, 250,000, 275,000, or about 300,000 ppm or more. In some examples, the aqueous liquid can have a concentration of at least one of NaBr, $CaCl_2$, $CaBr_2$, $ZnBr_2$, KCl, and NaCl of about 0.1% w/v to about 20% w/v, or about 0.1% w/v or less, or about 0.5% w/v, 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30% w/v or more.

The functionalized polysaccharide can be a friction reducer. For example, in various embodiments, as compared to a corresponding composition that is free of the functionalized polysaccharide, the composition including the functionalized polysaccharide experiences lower friction. The functionalized polysaccharide can be a viscosifier; for example, a crosslinked form of the functionalized polysaccharide can provide viscosification, such as crosslinked using any suitable crosslinker described herein. For example, in some embodiments, as compared to a corresponding composition that is free of the functionalized polysaccharide, the composition including the functionalized polysaccharide has a higher viscosity. In some embodiments, the functionalized polysaccharide can be a friction reducer and a viscosifier. In some embodiments, the method of treating a subterranean formation includes crosslinking the functionalized polysaccharide using a suitable crosslinker, such as above-surface, downhole, or a combination thereof.

For example, at a loading of about 10 pounds of the functionalized polysaccharide per thousand gallons at a flow rate of about 20 gallons per minute, as compared to a corresponding composition that is free of the functionalized polysaccharide, the composition including the functionalized polysaccharide provides about 50% to about 100% greater friction reduction, about 60% to about 80% greater friction reduction, or about 50% or less, or about 55%, 60, 65, 70, 75, 80, 85, 90, 95, 100, 105, 110, 120, 130, 140, 150, 160, 170, 180, 190, 200, 250, 300, 400, or about 500% greater friction reduction.

Functionalized Polysaccharide.

The composition includes a functionalized polysaccharide. The composition can include one functionalized polysaccharide, or more than one functionalized polysaccharide. The functionalized polysaccharide includes a hydroxy($C_1$-$C_5$)alkyl functionalization (e.g., at least one hydroxy($C_1$-$C_5$) alkyl functionalization). The functionalized polysaccharide includes a polyhydroxy($C_2$-$C_5$)alkyl functionalization (e.g., at least one polyhydroxy($C_2$-$C_5$)alkyl functionalization). The functionalization of the polysaccharide can be a replacement of the —H of an —OH group that is part of a corresponding polysaccharide that is free of the functionalization (e.g., substitution on an —OH group of the native polysaccharide). The functionalization of the polysaccharide can be a replacement of an —H of an —OH group on a group that is substituted in place of an —H of an —OH group that is part of a corresponding polysaccharide that is free of the functionalization (e.g., substitution on an —OH group of a substituent of the polysaccharide that is substituted on an —OH group of the native polysaccharide). Any suitable amount of the composition can be the one or more functionalized polysaccharides, such as about 0.01 wt % to about 100 wt % of the composition, about 0.01 wt % to about 5 wt %, about 0.05 wt % to about 1 wt %, or about 0.01 wt % or less, or about 0.05 wt %, 0.08, 0.1, 0.15, 0.2, 0.3, 0.4, 0.5, 0.6, 0.7, 0.8, 0.9, 1, 1.2, 1.4, 1.6, 1.8, 2, 2.5, 3, 3.5, 4, 4.5, 5, 6, 7, 8, 9, 10, 15, 20, 25, 30, 35, 40, 45, 50, 55, 60, 65, 70, 75, 80, 85, 90, 95, 96, 97, 98, 99 wt %, or about 99.9 wt % or more of the composition including the functionalized polysaccharide is the functionalized polysaccharide.

In some embodiments, the functionalized polysaccharide can be substantially free of crosslinking. In some embodiments, the functionalized polysaccharide can be crosslinked to any suitable degree, such as via any crosslinker described herein, such as via any method of crosslinking (e.g., chemical crosslinking). The functionalized polysaccharide can have any suitable degree of polymerization. For example, the functionalized polysaccharide can have a degree of polymerization of about 5 to about 500,000, about 10 to about 100,000, or about 5 or less, or about 10, 15, 20, 25, 50, 75, 100, 125, 150, 175, 200, 250, 500, 750, 1,000, 1,250, 1,500, 2,000, 2,500, 5,000, 7,500, 10,000, 15,000, 20,000, 25,000, 50,000, 75,000, 100,000, 250,000, or about 500,000 or more. The functionalized polysaccharide can have any suitable molecular weight, such as about 500 g/mol to about 10,000,000 g/mol, about 1,000 g/mol to about 5,000,000 g/mol, about 500 g/mol or less, or about 1,000 g/mol, 1,500, 2,000, 2,500, 5,000, 7,500, 10,000, 15,000, 20,000, 25,000, 50,000, 75,000, 100,000, 150,000, 200,000, 250,000, 500,000, 750,000, 1,000,000, 1,500,000, 2,000,000, 2,500,000, 5,000,000, 7,500,000, or about 10,000,000 or more.

The functionalized polysaccharide can have any suitable number of the hydroxy($C_1$-$C_5$)alkyl functionalizations per saccharide monomer. For example, the average number of the hydroxy($C_1$-$C_5$)alkyl functionalizations per saccharide monomer of the functionalized polysaccharide (e.g., degree of substitution) can be about 0.01 to about 10, about 1.5 to about 3, about 2 to about 3, or about 0.01 or less, or about 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.5, 5, 6, 7, 8, 9, or about 10 or more. Each of the hydroxy($C_1$-$C_5$) alkyl functionalizations can independently be a terminal functionalization (e.g., is not further substituted and has an OH group) or an intermediate functionalization (e.g., is further substituted and the —OH group is substituted).

In various embodiments, the hydroxy($C_1$-$C_5$)alkyl functionalization can have the structure $R^1$—O—($C_1$-$C_5$)alkylene-, wherein at each occurrence, $R^1$ is chosen from —H, an hydroxy($C_1$-$C_5$)alkyl functionalization, and a polyhydroxy ($C_2$-$C_5$)alkyl functionalization. The hydroxy($C_1$-$C_5$)alkyl functionalization can be a hydroxy($C_1$-$C_3$)alkyl functionalization. The hydroxy($C_1$-$C_5$)alkyl functionalization can be a hydroxyethyl functionalization. In some embodiments, the hydroxy($C_1$-$C_5$)alkyl functionalization is an HE (e.g., hydroxyethyl) functionalization having the structure $R^1$—O—$CH_2$—$CH_2$—, wherein at each occurrence, $R^1$, $R^2$, and $R^3$ are each independently chosen from —H, HE, and DHP.

The functionalized polysaccharide can have any suitable number of the polyhydroxy($C_2$-$C_5$)alkyl functionalizations per saccharide monomer. For example, the average number of the polyhydroxy($C_2$-$C_5$)alkyl functionalizations per saccharide monomer of the functionalized polysaccharide (e.g., degree of substitution) can be about 0.1 to about 10, about 0.1 to about 1, or about 0.01 or less, or about 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.5, 5, 6, 7, 8, 9, or about 10 or more. Each of the polyhydroxy($C_2$-$C_5$)alkyl functionalizations can independently be a terminal functionalization (e.g., is not further substituted and has an OH group) or an intermediate functionalization (e.g., is further substituted and the —OH group is substituted).

In various embodiments, the polyhydroxy($C_2$-$C_5$)alkyl functionalization can be a dihydroxy($C_1$-$C_5$)alkyl functionalization. The polyhydroxy($C_2$-$C_5$)alkyl functionalization can have the structure $R^2$—O—$CH_2$—$CH(OR^3)$—($C_0$-$C_3$) alkylene-, wherein $R^2$ and $R^3$ are each independently chosen from —H, an hydroxy($C_1$-$C_5$)alkyl functionalization, and a polyhydroxy($C_2$-$C_5$)alkyl functionalization. The polyhydroxy($C_2$-$C_5$)alkyl functionalization can be a dihydroxy($C_2$-$C_5$)alkyl functionalization. The polyhydroxy($C_2$-$C_5$)alkyl functionalization can be a dihydroxypropyl functionalization. The polyhydroxy($C_2$-$C_5$)alkyl functionalization can be a DHP (e.g., dihydroxypropyl) functionalization having the structure $R^2$—O—$CH_2$—$CH(OR^3)$—$CH_2$—, wherein, at each occurrence, $R^1$, $R^2$, and $R^3$ are each independently chosen from —H, HE, and DHP.

In some embodiments, the hydroxy($C_1$-$C_5$)alkyl functionalization is an HE functionalization having the structure $R^1$—O—$CH_2$—$CH_2$—, and the polyhydroxy($C_2$-$C_5$)alkyl functionalization is a DHP functionalization having the structure $R^2$—O—$CH_2$—$CH(OR^3)$—$CH_2$—, wherein at each occurrence, $R^1$, $R^2$, and $R^3$ are each independently chosen from —H, HE, and DHP. The polysaccharide can include functionalities that can substitute one another any suitable number of times, such as 1, 2, 3, 4, or 5 times.

In some embodiments, the polysaccharide can include functionalities that can substitute one another once. For example, the hydroxy($C_1$-$C_5$)alkyl functionalization can be an HE functionalization having the structure $R^1$—O—$CH_2$—$CH_2$—. The polyhydroxy($C_2$-$C_5$)alkyl functionalization can be a DHP functionalization having the structure $R^2$—O—$CH_2$—$CH(OR^3)$—$CH_2$—. At each occurrence, $R^1$, $R^2$, and $R^3$ can each be independently chosen from —H, HE2, and DHP2. The variable HE2 can be H—O—$CH_2$—$CH_2$—, and DHP2 can be H—O—$CH_2$—$CH(OR^3)$—$CH_2$—.

In some embodiments, the polysaccharide can include functionalities that can substitute one another twice. For example, the hydroxy($C_1$-$C_5$)alkyl functionalization can be an HE functionalization having the structure $R^1$—O—$CH_2$—$CH_2$—. The polyhydroxy($C_2$-$C_5$)alkyl functionalization can be a DHP functionalization having the structure $R^2$—O—$CH_2$—$CH(OR^3)$—$CH_2$—. At each occurrence, $R^1$, $R^2$, and $R^3$ can be each independently chosen from —H, HE2, and DHP2. The variable HE2 can be $R^5$—O—$CH_2$—$CH_2$—. The variable DHP2 can be $R^6$—O—$CH_2$—CH($OR^7$)—$CH_2$—. At each occurrence $R^5$, $R^6$, and $R^7$ can be each independently chosen from —H, HE3, and DHP3. The variable HE3 can be H—O—$CH_2$—$CH_2$—. The variable DHP3 can be H—O—$CH_2$—CH(OH)—$CH_2$—.

The functionalized polysaccharide can be any suitable polysaccharide. The functionalized polysaccharide can be a homopolymer, or a heteropolymer (e.g., a copolymer). The functionalized polysaccharide can be linear or branched. The functionalized polysaccharide can be a polysaccharide chosen from at least one of alginate, chitosan, curdlan, dextran, derivatized dextran, emulsan, a galactoglucopolysaccharide, gellan, glucuronan, N-acetyl-heparosan, hyaluronic acid, kefiran, lentinan, levan, mauran, pullulan, scleroglucan, schizophyllan, stewartan, succinoglycan, xanthan, diutan, welan, starch, tamarind, tragacanth, guar gum, gum ghatti, gum arabic, locust bean gum, and cellulose. In some embodiments, the functionalized polysaccharide is a functionalized cellulose, such as a functionalized linear cellulose. The functionalized polysaccharide can be a functionalized cellulose homopolymer, such as a functionalized linear cellulose homopolymer.

In some embodiments, the functionalized polysaccharide is cellulose, and without the functionalization the polysaccharide has a repeating unit having the structure:

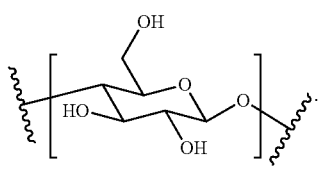

In some embodiments, the functionalized polysaccharide has a repeating unit having the structure:

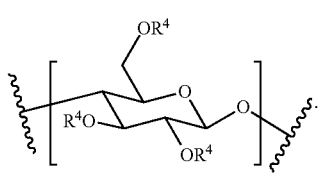

At each occurrence, $R^4$ can be independently chosen from —H, HE, and HDP. The variable HE can have the structure $R^1$—O—$CH_2$—$CH_2$—. The variable DHP can have the structure $R^2$—O—$CH_2$—$CH(OR^3)$—$CH_2$—. At each occurrence, $R^1$, $R^2$, and $R^3$ can be each independently chosen from —H, HE, and DHP.

In some embodiments, the linear functionalized polysaccharide has a repeating unit having the structure:

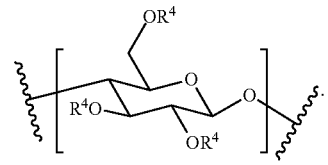

At each occurrence, $R^4$ can be independently chosen from —H, HE, and HDP. The variable HE can have the structure $R^1$—O—$CH_2$—$CH_2$—. The variable DHP can have the structure $R^2$—O—$CH_2$—$CH(OR^3)$—$CH_2$—. At each occurrence, $R^1$, $R^2$, and $R^3$ can be each independently chosen from —H, HE2, and DHP2. The variable HE2 can be H—O—$CH_2$—$CH_2$—. The variable DHP2 can be H—O—$CH_2$—CH(OH)—$CH_2$—.

In some embodiments, the linear functionalized polysaccharide has a repeating unit having the structure:

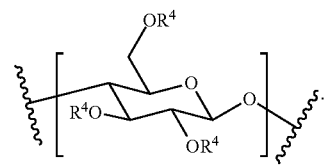

At each occurrence, $R^4$ can be independently chosen from —H, HE, and HDP. The variable HE can have the structure $R^1$—O—$CH_2$—$CH_2$—. The variable DHP can have the structure $R^2$—O—$CH_2$—$CH(OR^3)$—$CH_2$—. At each occurrence, $R^1$, $R^2$, and $R^3$ can be each independently chosen from —H, HE2, and DHP2. The variable HE2 can be $R^5$—O—$CH_2$—$CH_2$—. The variable DHP2 can be $R^6$—O—$CH_2$—CH($OR^7$)—$CH_2$—. At each occurrence $R^5$, $R^6$, and $R^7$ can be each independently chosen from —H, HE3, and DHP3. The variable HE3 can be H—O—$CH_2$—$CH_2$—. The variable DHP3 can be H—O—$CH_2$—CH(OH)—$CH_2$—.

In various embodiments, a repeating unit of the functionalized polysaccharide can have the structure:

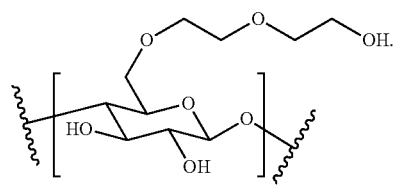

In various embodiments, a repeating unit of the functionalized polysaccharide can have the structure:

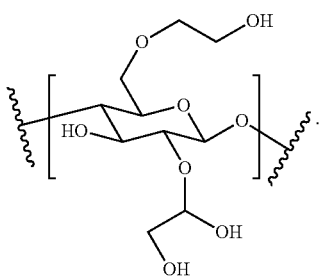

In various embodiments, a repeating unit of the functionalized polysaccharide can have the structure:

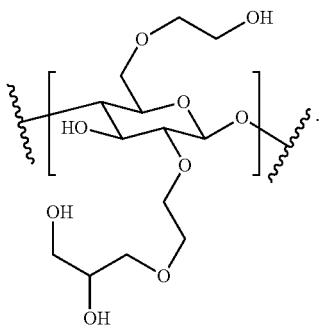

The polymers described herein can terminate in any suitable way. In some embodiments, the polymers can terminate with an end group that is independently chosen from a suitable polymerization initiator, —H, —OH, a substituted or unsubstituted $(C_1-C_{20})$hydrocarbyl (e.g., $(C_1-C_{10})$alkyl or $(C_6-C_{20})$aryl) interrupted with 0, 1, 2, or 3 groups independently selected from —O—, substituted or unsubstituted —NH—, and —S—, a poly(substituted or unsubstituted $(C_1-C_{20})$hydrocarbyloxy), and a poly(substituted or unsubstituted $(C_1-C_{20})$hydrocarbylamino).

Other Components.

The composition including the functionalized polysaccharide, or a mixture including the composition, can include any suitable additional component in any suitable proportion, such that the functionalized polysaccharide, composition, or mixture including the same, can be used as described herein.

In some embodiments, the composition includes one or more viscosifiers. The viscosifier can be any suitable viscosifier. The viscosifier can affect the viscosity of the composition or a solvent that contacts the composition at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.000.1 wt % to about 10 wt % of the composition or a mixture including the same, about 0.004 wt % to about 0.01 wt %, or about 0.000.1 wt % or less, 0.000.5 wt %, 0.001, 0.005, 0.01, 0.05, 0.1, 0.5, 1, 2, 3, 4, 5, 6, 7, 8, 9, or about 10 wt % or more of the composition or a mixture including the same.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a polysaccharide, and a poly($(C_2-C_{10})$alkene), wherein the $(C_2-C_{10})$alkene is substituted or unsubstituted. The viscosifier can include at least one of poly(acrylic acid) or $(C_1-C_5)$alkyl esters thereof, poly(methacrylic acid) or $(C_1-C_5)$alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted $(C_2-C_{50})$hydrocarbyl having at least one aliphatic unsaturated C—C bond therein, and a substituted or unsubstituted $(C_2-C_{50})$alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted $(C_1-C_{20})$alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted $(C_1-C_{20})$alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted $(C_1-C_{20})$alkenoic substituted or unsubstituted $(C_1-C_{20})$alkanoic anhydride, a substituted or unsubstituted $(C_1-C_{20})$alkenoic substituted or unsubstituted (C$_1$-C$_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—(C$_1$-C$_{10}$)alkenyl nitrogen containing substituted or unsubstituted (C$_1$-C$_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the composition can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a (C$_1$-C$_{30}$)hydrocarbylboronic acid, a (C$_1$-C$_{30}$)hydrocarbyl ester of a (C$_1$-C$_{30}$)hydrocarbylboronic acid, a (C$_1$-C$_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a (C$_1$-C$_{20}$)alkylenebiacrylamide (e.g., methylenebisacrylamide), a poly((C$_1$-C$_{20}$)alkenyl)-substituted mono- or poly-(C$_1$-C$_{20}$)alkyl ether (e.g., pentaerythritol allyl ether), and a poly(C$_2$-C$_{20}$)alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000.01 wt % to about 5 wt % of the composition or a mixture including the same, about 0.001 wt % to about 0.01 wt %, or about 0.000.01 wt % or less, or about 0.000.05 wt %, 0.000.1, 0.000.5, 0.001, 0.005, 0.01, 0.05, 0.1, 0.5, 1, 2, 3, 4, or about 5 wt % or more.

In some embodiments, the composition can include one or more breakers. In various embodiments, a breaker can be formed by direct chemical reaction of the functionalized polysaccharide with a solvent or carrier fluid, by a side reaction of a solvent or carrier fluid with a component that generates an active species that reacts with the functionalized polysaccharide, or by decomposition of a solvent or carrier fluid to yield a reactive species which can in-turn react with the functionalized polysaccharide. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes at least one of a Na$^+$, K$^+$, Li$^+$, Zn$^+$, NH$_4^+$, Fe$^{2+}$, Fe$^{3+}$, Cu$^{1+}$, Cu$^{2+}$, Ca$^{2+}$, Mg$^{2+}$, Zn$^{2+}$, and an Al$^{3+}$ salt of a chloride, fluoride, bromide, phosphate, or sulfate ion. In some examples, the breaker can be an oxidative breaker or an enzymatic breaker. An oxidative breaker can be at least one of a Na$^+$, K$^+$, Li$^+$, Zn$^+$, NH$_4^+$, Fe$^{2+}$, Fe$^{3+}$, Cu$^{1+}$, Cu$^{2+}$, Ca$^{2+}$, Mg$^{2+}$, Zn$^{2+}$, and an Al salt of a persulfate, percarbonate perborate, peroxide, perphosphosphate, permanganate, chlorite, or hypochlorite ion. An enzymatic breaker can be at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the composition or a mixture including the same, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The composition, or a mixture including the composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a C$_2$-C$_{40}$ fatty acid C$_1$-C$_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, naphthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The composition including the functionalized polysaccharide or a mixture including the same can include any suitable downhole fluid. The composition including the functionalized polysaccharide can be combined with any suitable downhole fluid before, during, or after the placement of the composition in the subterranean formation or the contacting of the composition and the subterranean material. In some examples, the composition including the functionalized polysaccharide is combined with a downhole fluid above the surface, and then the combined composition is placed in a subterranean formation or contacted with a subterranean material. In another example, the composition including the functionalized polysaccharide is injected into a subterranean formation to combine with a downhole fluid, and the combined composition is contacted with a subterranean material or is considered to be placed in the subterranean formation. The placement of the composition in the subterranean formation can include contacting the subterranean material and the mixture. Any suitable weight percent of the composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture including the same.

In some embodiments, the composition, or a mixture including the same, can include any suitable amount of any suitable material used in a downhole fluid. For example, the composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the composition or a mixture including the same can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTANT™ emulsion stabilizer; LE SUPERMUL™, EZ MUL® NT, and FORTI-MUL® emulsifiers; DRIL TREAT® oil wetting agent for heavy fluids; AQUATONE-S™ wetting agent; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the composition or a mixture including the same can include one or more additive components such as: X-TEND® II, PAC™-R, PAC™-L, LIQUI-VIS® EP, BRINEDRIL-VIS™, BARAZAN®, N-VIS®, and AQUAGEL® viscosifiers; THERMA-CHEK®, N-DRIL™, N-DRIL™ HT PLUS, IMPERMEX®, FILTERCHEK™, DEXTRID®, CARBONOX®, and BARANEX® filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™, EP MUDLUBE®, and DRIL-N-SLIDE™ lubricants; QUIK-THIN®, IRON-THIN™, THERMA-THIN®, and ENVIRO-THIN™ thinners; SOURSCAV™ scavenger; BARACOR® corrosion inhibitor; and WALL-NUT®, SWEEP-WATE®, STOP-PIT™, PLUG-GIT®, BARACARB®, DUO-SQUEEZE®, BAROFIBRE™ STEELSEAL®, and HYDRO-PLUG® lost circulation management materials. Any suitable proportion of the composition or mixture including the composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture.

In various embodiments, the composition or mixture can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

System or Apparatus.

In various embodiments, the present invention provides a system. The system can be any suitable system that can use or that can be generated by use of an embodiment of the composition described herein in a subterranean formation, or that can perform or be generated by performance of a method for using the composition described herein. The system can include a composition including a functionalized polysaccharide that includes a hydroxy($C_1$-$C_5$)alkyl functionalization and a polyhydroxy($C_2$-$C_5$)alkyl functionalization. The system can also include a subterranean formation including the composition therein. In some embodiments, the composition in the system can also include a downhole fluid, or the system can include a mixture of the composition and downhole fluid. In some embodiments, the system can include a tubular, and a pump configured to pump the composition into the subterranean formation through the tubular.

Various embodiments provide systems and apparatus configured for delivering the composition described herein to a subterranean location and for using the composition therein, such as for a fracturing operation (e.g., pre-pad, pad, slurry, or finishing stages). In various embodiments, the system or apparatus can include a pump fluidly coupled to a tubular (e.g., any suitable type of oilfield pipe, such as pipeline, drill pipe, production tubing, and the like), with the tubular containing a composition including the functionalized polysaccharide described herein.

The pump can be any suitable pump. The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps. In some embodiments, the pump can be a high flow pump. As used herein, the term "high flow pump" refers to a pump that generates a high fluid flow rate, for example, such that turbulent flow occurs in at least some pipes downstream of the pump.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

FIG. 1 shows an illustrative schematic of systems and apparatuses that can deliver embodiments of the compositions of the present invention to a subterranean location, according to one or more embodiments. It should be noted that while FIG. 1 generally depicts a land-based system or apparatus, it is to be recognized that like systems and apparatuses can be operated in subsea locations as well. Embodiments of the present invention can have a different scale than that depicted in FIG. 1. As depicted in FIG. 1, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 1 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 1.

Composition for Treatment of a Subterranean Formation.

Various embodiments provide a composition for treatment of a subterranean formation. The composition can be any suitable composition that can be used to perform an embodiment of the method for treatment of a subterranean formation described herein. For example, the composition can include a functionalized polysaccharide including a hydroxy($C_1$-$C_5$)alkyl functionalization and a polyhydroxy ($C_2$-$C_5$)alkyl functionalization.

In some embodiments, the composition can be a composition for fracturing of a subterranean formation or subterranean material, or a fracturing fluid. The composition can include any component that can be included in a fracturing fluid.

In some embodiments, the composition can include a functionalized linear cellulose including a hydroxyethyl functionalization and a dihydroxypropyl functionalization. An average number of the hydroxyethyl functionalizations per saccharide monomer of the cellulose can be about 0.01 to about 10. An average number of the dihydroxypropyl functionalizations per saccharide monomer of the cellulose can be about 0.01 to about 10.

In various embodiments, the composition can include a functionalized linear cellulose including an HE functionalization having the structure $R^1$—O—$CH_2$—$CH_2$— and a DHP functionalization having the structure $R^2$—O—$CH_2$—CH($OR^3$)—$CH_2$—. At each occurrence, $R^1$, $R^2$, and $R^3$ can be each independently chosen from —H, HE, and DHP. An average number of the HE functionalizations per saccharide monomer of the functionalized linear cellulose can be about 0.01 to about 10. An average number of the DHP functionalizations per saccharide monomer of the functionalized linear cellulose can be about 0.01 to about 10.

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming a composition including a functionalized polysaccharide including a hydroxy($C_1$-$C_5$)alkyl functionalization and a polyhydroxy ($C_2$-$C_5$)alkyl functionalization. The method can include mixing the functionalized polysaccharide with other components of the composition to form the composition. The method can include functionalizing the unfunctionalized or partially-functionalized polysaccharide to form the functionalized polysaccharide.

EXAMPLES

Various embodiments of the present invention can be better understood by reference to the following Examples which are offered by way of illustration. The present invention is not limited to the Examples given herein.

Example 1

Preparation of Samples

A cellulosic linear polymer was functionalized with hydroxyethyl (HE) and dihydroxypropyl (DHP), to form a hydroxyethyl dihydroxypropyl cellulose (HEDHPC). The degree of substitution of the hydroxyethyl group was 2.2 per monomer and the degree of molecular substitution of the dihydroxypropyl group was 0.6 per monomer.

Example 2

Friction Reduction

Friction reduction was measured for the HEDHPC of Example 1 at various loadings and for 25 lb/1000 gal guar powder, 40 lb/1000 gal carboxymethylcellulose powder, and 30 lb/1000 gal of a blend of carboxymethylcellulose of different molecular. The percent friction reduction was analyzed by pumping the samples at 10 gallons per minute through a ½" diameter friction loop while measuring the pressure drop between two pressure transducers. The percent friction reduction was calculated based on the measured pressure drop of fresh water at the same tested flow rate and ambient temperature (room temperature) and pressure.

Figure 2:
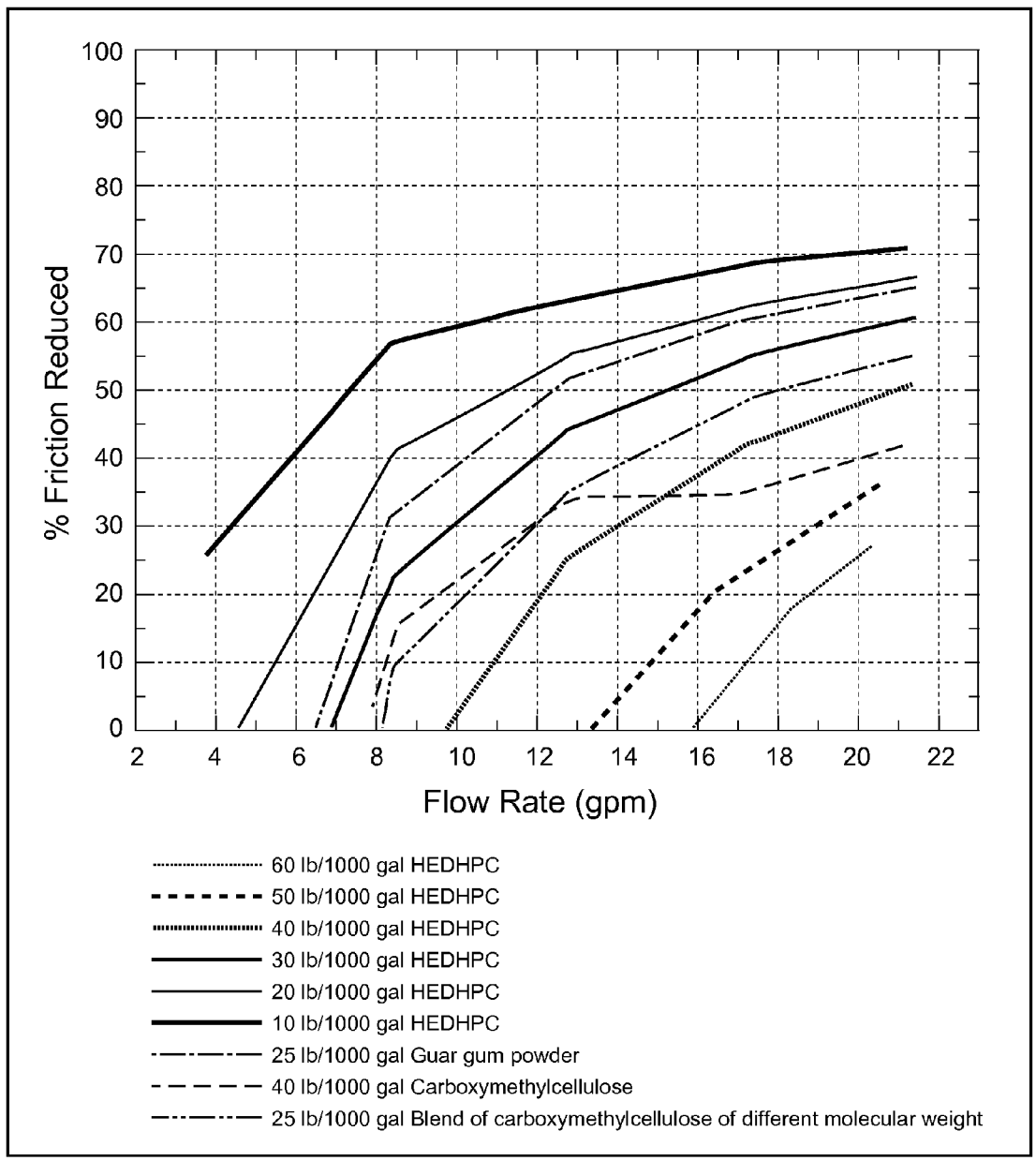
FIG. 2 illustrates percent friction reduction versus flow rate for various compositions, in accordance with various embodiments.

FIG. 2 illustrates the friction reduction percentages as a function of flow rate. The most superior friction reduction was shown by the sample having 10 lb/1000 gal of the HEDHPC which gave a percent friction reduction of 70% at high flow rates.

Example 3

Figure 3:
FIG. 3 illustrates a photograph of various friction reducers in a brine solution that includes iron, in accordance with various embodiments.

Samples of 1 gallons per thousand gallons (GPT) and 10 GPT of a polyacrylamide friction reducer in a brine that included 100 ppm iron were prepared. The brine was similar to sea water with 1.94, 1.08, 0.13, 0.04 and 0.04 wt % of Na, Mg, Ca, and K ions, respectively, as well as containing 100 ppm of Fe ions, having a TDS of 10,000 mg/L. The polyacrylamide friction reducer was an oil-external emulsion of 25-30 wt % polyacrylamide having 30 mol % hydrolyzed acrylamide units (in the form of sodium acrylate units), having a MW of about 10,000,000, with about 65 vol % hydrocarbon external phase (hydrotreated light petroleum distillate) and about 35 vol % internal phase. A sample of 10 lb/1000 gallons (PPTG) of the HEDHPC of Example 1 was prepared in an identical brine solution. FIG. 3 illustrates a photograph of the solutions, with the left jar containing the 10 GPT polyacrylamide friction reducer in brine with 100 ppm iron and having some flocculant at the bottom, the middle jar containing the 1 GPT polyacrylamide friction reducer in brine with 100 ppm iron and having less flocculant at the bottom, and the right jar containing the 10 PPTG HEDHPC in brine with 100 ppm iron and having no flocculant at the bottom.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:

placing in a subterranean formation a composition comprising a functionalized polysaccharide comprising a hydroxy($C_1$-$C_5$)alkyl functionalization; and a polyhydroxy($C_2$-$C_5$)alkyl functionalization.

Embodiment 2 provides the method of Embodiment 1, wherein the method further comprises obtaining or providing the composition, wherein the obtaining or providing of the composition occurs above-surface.

Embodiment 3 provides the method of any one of Embodiments 1-2, wherein the method further comprises obtaining or providing the composition, wherein the obtaining or providing of the composition occurs in the subterranean formation.

Embodiment 4 provides the method of any one of Embodiments 1-3, wherein as compared to a corresponding composition that is free of the functionalized polysaccharide, the composition comprising the functionalized polysaccharide experiences lower friction.

Embodiment 5 provides the method of any one of Embodiments 1-4, wherein as compared to a corresponding composition that is free of the functionalized polysaccharide, the composition comprising the functionalized polysaccharide has a higher viscosity.

Embodiment 6 provides the method of any one of Embodiments 1-5, wherein at a loading of about 10 pounds of the functionalized polysaccharide per thousand gallons at a flow rate of about 20 gallons per minute, as compared to a corresponding composition that is free of the functionalized polysaccharide, the composition comprising the functionalized polysaccharide provides about 50% to about 100% greater friction reduction.

Embodiment 7 provides the method of any one of Embodiments 1-6, wherein at a loading of about 10 pounds of the functionalized polysaccharide per thousand gallons at a flow rate of about 20 gallons per minute, as compared to a corresponding composition that is free of the functionalized polysaccharide, the composition comprising the functionalized polysaccharide provides about 60% to about 80% greater friction reduction.

Embodiment 8 provides the method of any one of Embodiments 1-7, wherein as compared to a corresponding composition that is free of the functionalized polysaccharide, the composition comprising the functionalized polysaccharide has a higher viscosity.

Embodiment 9 provides the method of any one of Embodiments 1-8, wherein the composition comprising the functionalized polysaccharide is a fracturing fluid.

Embodiment 10 provides the method of any one of Embodiments 1-9, comprising fracturing the subterranean formation using the composition comprising the functionalized polysaccharide.

Embodiment 11 provides the method of any one of Embodiments 1-10, wherein about 0.01 wt % to about 100 wt % of the composition comprising the functionalized polysaccharide is the functionalized polysaccharide.

Embodiment 12 provides the method of any one of Embodiments 1-11, wherein about 0.05 wt % to about 1 wt % of the composition comprising the functionalized polysaccharide is the functionalized polysaccharide.

Embodiment 13 provides the method of any one of Embodiments 1-12, wherein the functionalized polysaccharide has a degree of polymerization of about 5 to about 500,000.

Embodiment 14 provides the method of any one of Embodiments 1-13, wherein the functionalized polysaccharide has a degree of polymerization of about 10 to about 100,000.

Embodiment 15 provides the method of any one of Embodiments 1-14, wherein the functionalized polysaccharide has a molecular weight of about 500 g/mol to about 10,000,000 g/mol.

Embodiment 16 provides the method of any one of Embodiments 1-15, wherein the functionalized polysaccharide has a molecular weight of about 1,000 g/mol to about 5,000,000 g/mol.

Embodiment 17 provides the method of any one of Embodiments 1-16, wherein the functionalization of the polysaccharide is a replacement of the —H of an —OH group that is part of a corresponding polysaccharide that is free of the functionalization, or a replacement of an —H of an —OH group on a group that is substituted in place of an —H of an —OH group that is part of a corresponding polysaccharide that is free of the functionalization.

Embodiment 18 provides the method of any one of Embodiments 1-17, wherein an average number of the hydroxy($C_1$-$C_5$)alkyl functionalizations per saccharide monomer of the functionalized polysaccharide is about 0.01 to about 10.

Embodiment 19 provides the method of any one of Embodiments 1-18, wherein an average number of the hydroxy($C_1$-$C_5$)alkyl functionalizations per saccharide monomer of the functionalized polysaccharide is about 1.5 to about 3.

Embodiment 20 provides the method of any one of Embodiments 1-19, wherein the hydroxy($C_1$-$C_5$)alkyl functionalization is a terminal or intermediate functionalization.

Embodiment 21 provides the method of any one of Embodiments 1-20, wherein the hydroxy($C_1$-$C_5$)alkyl functionalization has the structure $R^1$—O—($C_1$-$C_5$)alkylene-, wherein at each occurrence, $R^1$ is chosen from —H, an hydroxy($C_1$-$C_5$)alkyl functionalization, and a polyhydroxy($C_2$-$C_5$)alkyl functionalization.

Embodiment 22 provides the method of any one of Embodiments 1-21, wherein the hydroxy($C_1$-$C_5$)alkyl functionalization is a hydroxy($C_1$-$C_3$)alkyl functionalization.

Embodiment 23 provides the method of any one of Embodiments 1-22, wherein the hydroxy($C_1$-$C_5$)alkyl functionalization is a hydroxyethyl functionalization.

Embodiment 24 provides the method of any one of Embodiments 1-23, wherein the hydroxy($C_1$-$C_5$)alkyl functionalization is an HE functionalization having the structure $R^1$—O—$CH_2$—$CH_2$—, wherein at each occurrence, $R^1$, $R^2$, and $R^3$ are each independently chosen from —H, HE, and DHP.

Embodiment 25 provides the method of any one of Embodiments 1-24, wherein an average number of the polyhydroxy($C_2$-$C_5$)alkyl functionalization per saccharide monomer of the functionalized polysaccharide is about 0.1 to about 10.

Embodiment 26 provides the method of any one of Embodiments 1-25, wherein an average number of the polyhydroxy($C_2$-$C_5$)alkyl functionalization per saccharide monomer of the functionalized polysaccharide is about 0.1 to about 1.

Embodiment 27 provides the method of any one of Embodiments 1-26, wherein the polyhydroxy($C_2$-$C_5$)alkyl functionalization is a terminal or intermediate functionalization.

Embodiment 28 provides the method of any one of Embodiments 1-27, wherein the polyhydroxy($C_2$-$C_5$)alkyl functionalization is a dihydroxy($C_1$-$C_5$)alkyl functionalization.

Embodiment 29 provides the method of any one of Embodiments 1-28, wherein the polyhydroxy($C_2$-$C_5$)alkyl functionalization has the structure $R^2$—O—$CH_2$—CH($OR^3$)—($C_0$-$C_3$)alkylene-, wherein $R^2$ and $R^3$ are each independently chosen from —H, an hydroxy($C_1$-$C_5$)alkyl functionalization, and a polyhydroxy($C_2$-$C_5$)alkyl functionalization.

Embodiment 30 provides the method of any one of Embodiments 1-29, wherein the polyhydroxy($C_2$-$C_5$)alkyl functionalization is a dihydroxy($C_2$-$C_5$)alkyl functionalization.

Embodiment 31 provides the method of Embodiment 1-30, wherein the polyhydroxy($C_2$-$C_5$)alkyl functionalization is a dihydroxypropyl functionalization.

Embodiment 32 provides the method of any one of Embodiments 1-31, wherein the polyhydroxy($C_2$-$C_5$)alkyl functionalization is a DHP functionalization having the structure $R^2$—O—$CH_2$—CH($OR^3$)—$CH_2$—, wherein at each occurrence, $R^1$, $R^2$, and $R^3$ are each independently chosen from —H, HE, and DHP.

Embodiment 33 provides the method of any one of Embodiments 1-32, wherein
the hydroxy($C_1$-$C_5$)alkyl functionalization is an HE functionalization having the structure $R^1$—O—$CH_2$—$CH_2$—, and
the polyhydroxy($C_2$-$C_5$)alkyl functionalization is a DHP functionalization having the structure $R^2$—O—$CH_2$—CH($OR^3$)—$CH_2$—,
wherein at each occurrence, $R^1$, $R^2$, and $R^3$ are each independently chosen from —H, HE, and DHP.

Embodiment 34 provides the method of any one of Embodiments 1-33, wherein
the hydroxy($C_1$-$C_5$)alkyl functionalization is an HE functionalization having the structure $R^1$—O—$CH_2$—$CH_2$—;
the polyhydroxy($C_2$-$C_5$)alkyl functionalization is a DHP functionalization having the structure $R^2$—O—$CH_2$—CH($OR^3$)—$CH_2$—;
at each occurrence, $R^1$, $R^2$, and $R^3$ are each independently chosen from —H, HE2, and DHP2;
HE2 is H—O—$CH_2$—$CH_2$—; and
DHP2 is H—O—$CH_2$—CH($OR^3$)—$CH_2$—.

Embodiment 35 provides the method of any one of Embodiments 1-34, wherein
the hydroxy($C_1$-$C_5$)alkyl functionalization is an HE functionalization having the structure $R^1$—O—$CH_2$—$CH_2$—;
the polyhydroxy($C_2$-$C_5$)alkyl functionalization is a DHP functionalization having the structure $R^2$—O—$CH_2$—CH($OR^3$)—$CH_2$—;
at each occurrence, $R^1$, $R^2$, and $R^3$ are each independently chosen from —H, HE2, and DHP2;
HE2 is $R^5$—O—$CH_2$—$CH_2$—;
DHP2 is $R^6$—O—$CH_2$—CH($OR^7$)—$CH_2$—;
wherein at each occurrence $R^5$, $R^6$, and $R^7$ are each independently chosen from —H, HE3, and DHP3;
HE3 is H—O—$CH_2$—$CH_2$—; and
DHP3 is H—O—$CH_2$—CH(OH)—$CH_2$—.

Embodiment 36 provides the method of any one of Embodiments 1-35, wherein the functionalized polysaccharide is a functionalized polysaccharide chosen from at least one of alginate, chitosan, curdlan, dextran, derivatized dextran, emulsan, a galactoglucopolysaccharide, gellan, glucuronan, N-acetyl-heparosan, hyaluronic acid, kefiran, lentinan, levan, mauran, pullulan, scleroglucan, schizophyllan, stewartan, succinoglycan, xanthan, diutan, welan, starch, tamarind, tragacanth, guar gum, gum ghatti, gum arabic, locust bean gum, and cellulose.

Embodiment 37 provides the method of any one of Embodiments 1-36, wherein the functionalized polysaccharide is a functionalized linear cellulose.

Embodiment 38 provides the method of any one of Embodiments 1-37, wherein the functionalized polysaccharide is a functionalized linear cellulose homopolymer.

Embodiment 39 provides the method of any one of Embodiments 1-38, wherein without the functionalization the polysaccharide has a repeating unit having the structure:

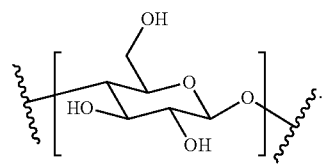

Embodiment 40 provides the method of any one of Embodiments 1-39, wherein the functionalized polysaccharide has a repeating unit having the structure:

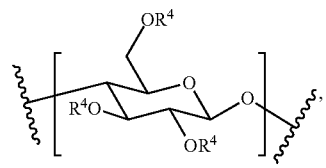

wherein
at each occurrence, $R^4$ is independently chosen from —H, HE, and HDP;
HE has the structure $R^1$—O—$CH_2$—$CH_2$—; and
DHP has the structure $R^2$—O—$CH_2$—CH($OR^3$)—$CH_2$—; and
at each occurrence, $R^1$, $R^2$, and $R^3$ are each independently chosen from —H, HE, and DHP.

Embodiment 41 provides the method of any one of Embodiments 1-40, wherein the linear functionalized polysaccharide has a repeating unit having the structure:

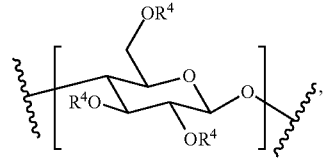

wherein
at each occurrence, $R^4$ is independently chosen from —H, HE, and HDP;
HE has the structure $R^1$—O—$CH_2$—$CH_2$—; and
DHP has the structure $R^2$—O—$CH_2$—CH($OR^3$)—$CH_2$—; and
at each occurrence, $R^1$, $R^2$, and $R^3$ are each independently chosen from —H, HE2, and DHP2;
HE2 is H—O—$CH_2$—$CH_2$—; and
DHP2 is H—O—$CH_2$—CH(OH)—$CH_2$—.

Embodiment 42 provides the method of any one of Embodiments 1-41, wherein the linear functionalized polysaccharide has a repeating unit having the structure:

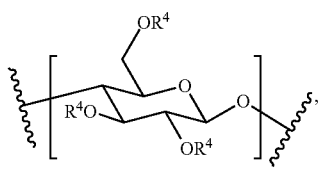

wherein at each occurrence, $R^4$ is independently chosen from —H, HE, and HDP;

HE has the structure $R^1$—O—$CH_2$—$CH_2$—; and

DHP has the structure $R^2$—O—$CH_2$—$CH(OR^3)$—$CH_2$—;

at each occurrence, $R^1$, $R^2$, and $R^3$ are each independently chosen from —H, HE2, and DHP2;

HE2 is $R^5$—O—$CH_2$—$CH_2$—;

DHP2 is $R^6$—O—$CH_2$—$CH(OR^7)$—$CH_2$—;

wherein at each occurrence $R^5$, $R^6$, and $R^7$ are each independently chosen from —H, HE3, and DHP3;

HE3 is H—O—$CH_2$—$CH_2$—; and

DHP3 is H—O—$CH_2$—$CH(OH)$—$CH_2$—.

Embodiment 43 provides the method of any one of Embodiments 1-42, wherein a repeating unit of the functionalized polysaccharide has the structure:

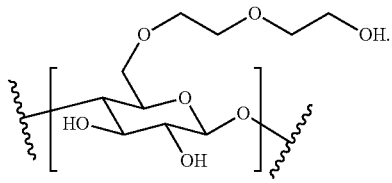

Embodiment 44 provides the method of any one of Embodiments 1-43, wherein a repeating unit of the functionalized polysaccharide has the structure:

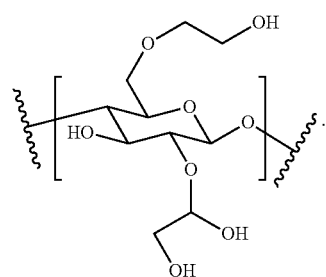

Embodiment 45 provides the method of any one of Embodiments 1-44, wherein a repeating unit of the functionalized polysaccharide has the structure:

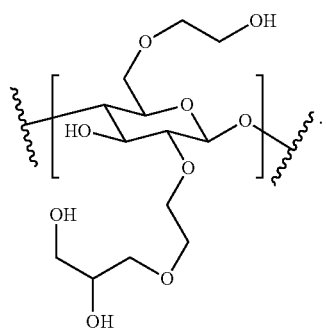

Embodiment 46 provides the method of any one of Embodiments 1-45, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 47 provides the method of any one of Embodiments 1-46, wherein the composition further comprises a proppant, a resin-coated proppant, or a combination thereof.

Embodiment 48 provides the method of any one of Embodiments 1-47, wherein the placing of the composition in the subterranean formation comprises pumping the composition through a tubular disposed in a wellbore and into the subterranean formation.

Embodiment 49 provides a system for performing the method of any one of Embodiments 1-48, the system comprising:

a tubular disposed in the subterranean formation; and a pump configured to pump the composition in the subterranean formation through the tubular.

Embodiment 50 provides a method of treating a subterranean formation, the method comprising:

placing in a subterranean formation a composition comprising a functionalized linear cellulose comprising
 a hydroxyethyl functionalization; and
 a dihydroxypropyl functionalization;
 wherein
  an average number of the hydroxyethyl functionalizations per saccharide monomer of the cellulose is about 0.01 to about 10, and
  an average number of the dihydroxypropyl functionalizations per saccharide monomer of the cellulose is about 0.01 to about 10.

Embodiment 51 provides a method of treating a subterranean formation, the method comprising:

placing in a subterranean formation a composition comprising a functionalized linear cellulose comprising
an HE functionalization having the structure $R^1$—O—$CH_2$—$CH_2$—; and
a DHP functionalization having the structure $R^2$—O—$CH_2$—$CH(OR^3)$—$CH_2$—;
wherein
at each occurrence, $R^1$, $R^2$, and $R^3$ are each independently chosen from —H, HE, and DHP,
an average number of the HE functionalizations per saccharide monomer of the functionalized linear cellulose is about 0.01 to about 10, and
an average number of the DHP functionalizations per saccharide monomer of the functionalized linear cellulose is about 0.01 to about 10.

Embodiment 52 provides a system comprising:
a composition comprising a functionalized polysaccharide comprising
a hydroxy($C_1$-$C_5$)alkyl functionalization; and
a polyhydroxy($C_2$-$C_5$)alkyl functionalization; and
a subterranean formation comprising the composition therein.

Embodiment 53 provides the system of Embodiment 52, further comprising
a tubular disposed in the subterranean formation; and
a pump configured to pump the composition in the subterranean formation through the tubular.

Embodiment 54 provides a composition for treatment of a subterranean formation, the composition comprising:
a functionalized polysaccharide comprising
a hydroxy($C_1$-$C_5$)alkyl functionalization; and
a polyhydroxy($C_2$-$C_5$)alkyl functionalization.

Embodiment 55 provides the composition of Embodiment 54, wherein the composition is a composition for fracturing of a subterranean formation.

Embodiment 56 provides a composition for treatment of a subterranean formation, the composition comprising:
a functionalized linear cellulose comprising
a hydroxyethyl functionalization; and
a dihydroxypropyl functionalization;
wherein
an average number of the hydroxyethyl functionalizations per saccharide monomer of the cellulose is about 0.01 to about 10, and
an average number of the dihydroxypropyl functionalizations per saccharide monomer of the cellulose is about 0.01 to about 10.

Embodiment 57 provides a composition for treatment of a subterranean formation, the composition comprising:
a functionalized linear cellulose comprising
an HE functionalization having the structure $R^1$—O—$CH_2$—$CH_2$—; and
a DHP functionalization having the structure $R^2$—O—$CH_2$—$CH(OR^3)$—$CH_2$—;
wherein
at each occurrence, $R^1$, $R^2$, and $R^3$ are each independently chosen from —H, HE, and DHP,
an average number of the HE functionalizations per saccharide monomer of the functionalized linear cellulose is about 0.01 to about 10, and
an average number of the DHP functionalizations per saccharide monomer of the functionalized linear cellulose is about 0.01 to about 10.

Embodiment 58 provides a method of preparing a composition for treatment of a subterranean formation, the method comprising:
forming a composition comprising a functionalized polysaccharide comprising
a hydroxy($C_1$-$C_5$)alkyl functionalization; and
a polyhydroxy($C_2$-$C_5$)alkyl functionalization.

Embodiment 59 provides the composition, method, or system of any one or any combination of Embodiments 1-58 optionally configured such that all elements or options recited are available to use or select from.

What is claimed is:

1. A method of treating a subterranean formation, comprising:
placing in a subterranean formation a composition comprising a functionalized polysaccharide comprising:
a hydroxy($C_1$-$C_5$)alkyl functionalization;
a polyhydroxy($C_2$-$C_5$)alkyl functionalization; and
wherein:
the hydroxy($C_1$-$C_5$)alkyl functionalization is an HE functionalization having the structure $R^1$—O—$CH_2$—$CH_2$—;
the polyhydroxy($C_2$-$C_5$)alkyl functionalization is a DHP functionalization having the structure $R^2$—O—$CH_2$—$CH(OR^3)$—$CH_2$—;
at each occurrence, $R^1$ and $R^2$ are each independently selected from the group consisting of $R^5$—O—$CH_2$—$CH_2$— and $R^6$—O—$CH_2$—$CH(OR^7)$—$CH_2$—;
at each occurrence, $R^3$ is independently selected from the group consisting of —H, $R^5$—O—$CH_2$—$CH_2$—, and $R^6$—O—$CH_7$—$CH(OR^7)$—$CH_2$—; and
at each occurrence, $R^5$, $R^6$, and $R^7$ are each independently selected from the group consisting of —H, H—O—$CH_2$—$CH_2$—, and H—O—$CH_2$—$CH(OH)$—$CH_2$—.

2. The method of claim 1, wherein as compared to a corresponding composition that is free of the functionalized polysaccharide, the composition comprising the functionalized polysaccharide experiences lower friction.

3. The method of claim 1, wherein at a loading of about 10 pounds of the functionalized polysaccharide per thousand gallons at a flow rate of about 20 gallons per minute, as compared to a corresponding composition that is free of the functionalized polysaccharide, the composition comprising the functionalized polysaccharide provides about 50% to about 100% greater friction reduction.

4. The method of claim 1, further comprising:
fracturing the subterranean formation with the composition comprising the functionalized polysaccharide and a proppant to form a fracture; and
depositing the proppant into the fracture.

5. The method of claim 1, further comprising fracturing the subterranean formation with the composition comprising the functionalized polysaccharide.

6. The method of claim 1, wherein an average number of the hydroxy($C_1$-$C_5$)alkyl functionalizations per saccharide monomer of the functionalized polysaccharide is about 0.01 to about 10.

7. The method of claim 1, wherein an average number of the polyhydroxy($C_2$-$C_5$)alkyl functionalization per saccharide monomer of the functionalized polysaccharide is about 0.1 to about 10.

8. The method of claim 1, wherein:
at each occurrence, $R^5$ and $R^6$ are each independently selected from the group consisting of H—O—$CH_2$—$CH_2$— and H—O—$CH_2$—$CH(OH)$—$CH_2$—.

9. The method of claim 1, wherein the functionalized polysaccharide is a functionalized linear cellulose.

10. The method of claim 1, wherein at each occurrence, $R^5$ and $R^6$ are each H—O—CH$_2$—CH$_2$— and $R^7$ is —H.

11. The method of claim 10, wherein at each occurrence, $R^3$ is —H.

12. The method of claim 1, wherein at each occurrence, $R^5$ and $R^6$ are each H—O—CH$_2$—CH(OH)—CH$_2$— and $R^7$ is —H.

13. The method of claim 12, wherein at each occurrence, $R^3$ is —H.

14. A method of treating a subterranean formation, the method comprising:
    placing in a subterranean formation a composition comprising a proppant and a functionalized linear cellulose comprising:
        a hydroxyethyl functionalization;
        a dihydroxypropyl functionalization; and
    wherein:
        an average number of the hydroxyethyl functionalizations per saccharide monomer of the cellulose is about 1.5 to about 3;
        an average number of the dihydroxypropyl functionalizations per saccharide monomer of the cellulose is about 0.1 to about 1;
        the hydroxy(C$_1$-C$_5$)alkyl functionalization is an HE functionalization having the structure $R^1$—O—CH$_2$—CH$_2$—;
        the polyhydroxy(C$_2$-C$_5$)alkyl functionalization is a DHP functionalization having the structure $R^2$—O—CH$_2$—CH(OR$^3$)—CH$_2$—;
        at each occurrence, $R^1$ and $R^2$ are each independently selected from the group consisting of $R^5$—O—CH$_2$—CH$_2$— and $R^6$—O—CH$_2$—CH(OR$^7$)—CH$_2$—;
        at each occurrence, $R^3$ is independently selected from the group consisting of —H, $R^5$—O—CH$_2$—CH$_2$—, and $R^6$—O—CH$_2$—CH(OR$^7$)—CH$_2$—; and
        at each occurrence, $R^5$, $R^6$, and $R^7$ are each independently selected from the group consisting of —H, H—O—CH$_2$—CH$_2$—, and H—O—CH$_2$—CH(OH)—CH$_2$—;
    fracturing, the subterranean formation with the composition to form a fracture; and
    depositing the proppant into the fracture.

15. The method of claim 14, wherein at each occurrence, $R^5$ and $R^6$ are each H—O—CH$_2$—CH$_2$— and $R^7$ is —H.

16. The method of claim 15, wherein at each occurrence, $R^3$ is —H.

17. The method of claim 14, wherein at each occurrence, $R^5$ and $R^6$ are each H—O—CH$_2$—CH(OH)—CH$_2$— and $R^7$ is —H.

18. The method of claim 17, wherein at each occurrence, $R^3$ is —H.

19. A system comprising:
    a tubular disposed in a subterranean formation; and
    a pump configured to pump a composition comprising a functionalized polysaccharide in the subterranean formation through the tubular, wherein the composition comprising the functionalized polysaccharide comprises:
        a hydroxy(C$_1$-C$_5$)alkyl functionalization;
        a polyhydroxy(C$_2$-C$_5$)alkyl functionalization; and
    wherein:
        the hydroxy(C$_1$-C$_5$)alkyl functionalization is an HE functionalization having the structure $R^1$—O—CH$_2$—CH$_2$—;
        the polyhydroxy(C$_2$-C$_5$)alkyl functionalization is a DHP functionalization having the structure $R^2$—O—CH$_2$—CH(OR$^3$)—CH$_2$—;
        at each occurrence, $R^1$ and $R^2$ are each independently selected from the group consisting of $R^5$—O—CH$_2$—CH$_2$— and $R^6$—O—CH$_2$—CH(OR$^7$)—CH$_2$—;
        at each occurrence, $R^3$ is independently selected from the group consisting of —H, $R^5$—O—CH$_2$—CH$_2$—, and $R^6$—O—CH$_2$—CH(OR$^7$)—CH$_2$—; and
        at each occurrence, $R^5$, $R^6$ and $R^7$ are each independently selected from the group consisting of —H, H—O—CH$_2$—CH$_2$—, and H—O—CH$_2$—CH(OH)—CH$_2$—.

20. The system of claim 19, wherein the composition further comprises a proppant.

* * * * *